(12) United States Patent
Liu

(10) Patent No.: US 11,337,220 B2
(45) Date of Patent: May 17, 2022

(54) INFORMATION INDICATION METHOD AND APPARATUS, BASE STATION, AND USER EQUIPMENT

(71) Applicant: BEIJING XIAOMI MOBILE SOFTWARE CO., LTD., Beijing (CN)

(72) Inventor: Yang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/763,886

(22) PCT Filed: Nov. 30, 2017

(86) PCT No.: PCT/CN2017/114024
§ 371 (c)(1),
(2) Date: May 13, 2020

(87) PCT Pub. No.: WO2019/104672
PCT Pub. Date: Jun. 6, 2019

(65) Prior Publication Data
US 2021/0176755 A1 Jun. 10, 2021

(51) Int. Cl.
*H04W 56/00* (2009.01)
*H04W 72/04* (2009.01)
(Continued)

(52) U.S. Cl.
CPC ......... *H04W 72/0493* (2013.01); *H04L 5/003* (2013.01); *H04L 27/26025* (2021.01);
(Continued)

(58) Field of Classification Search
CPC ............ H04W 72/0493; H04W 16/28; H04W 56/001; H04W 72/005; H04W 72/0446;
(Continued)

(56) References Cited

U.S. PATENT DOCUMENTS

| 8,521,164 B2 | 8/2013 | Kwack |
| 9,432,138 B2 | 8/2016 | Kang |

(Continued)

FOREIGN PATENT DOCUMENTS

| CN | 102104973 A | 6/2011 |
| CN | 102404689 A | 4/2012 |

(Continued)

OTHER PUBLICATIONS

NPL search history (Year: 2021).*
(Continued)

*Primary Examiner* — Sai Ming Chan
(74) *Attorney, Agent, or Firm* — Syncoda LLC; Feng Ma

(57) ABSTRACT

An information indication method includes: adding time-frequency indication information configured for a CORESET of RMSI to a PBCH of a SSB; if the time-frequency indication information indicates the CORESET of RMSI and the SSB are multiplexed in time division, querying a pre-stored correlation according to a present band, an SCS of the SSB and an SCS of the CORESET of RMSI to obtain an extended RB offset minimum set corresponding to the present band; an RB offset is selected from the obtained extended RB offset minimum set, and adding an offset index of the selected RB offset to the time-frequency indication information; and sending the SSB comprising the time-frequency indication information to UE in a beam scanning manner.

15 Claims, 18 Drawing Sheets

(51) Int. Cl.
  *H04L 27/26* (2006.01)
  *H04L 5/00* (2006.01)
  *H04W 16/28* (2009.01)
  *H04W 72/00* (2009.01)
(52) U.S. Cl.
  CPC ......... *H04W 16/28* (2013.01); *H04W 56/001* (2013.01); *H04W 72/005* (2013.01); *H04W 72/0446* (2013.01); *H04W 72/0453* (2013.01)
(58) Field of Classification Search
  CPC ......... H04W 72/0453; H04L 27/26025; H04L 5/003
  See application file for complete search history.

(56) References Cited

U.S. PATENT DOCUMENTS

| | | | |
|---|---|---|---|
| 9,628,140 | B2 | 4/2017 | Xie et al. |
| 2011/0223915 | A1 | 9/2011 | Kwack |
| 2014/0003349 | A1 | 1/2014 | Kang |
| 2014/0003379 | A1 | 1/2014 | Kang |
| 2014/0050165 | A1 | 2/2014 | Park |
| 2014/0348077 | A1 | 11/2014 | Chen |
| 2015/0016370 | A1 | 1/2015 | Takeda et al. |
| 2016/0277065 | A1* | 9/2016 | Xie ..................... H04L 5/0051 |
| 2017/0064685 | A1* | 3/2017 | Rico Alvarino ........ H04L 5/005 |
| 2017/0222768 | A1* | 8/2017 | Lee ..................... H04L 25/0204 |
| 2017/0353254 | A1 | 12/2017 | Islam et al. |
| 2019/0150121 | A1* | 5/2019 | Abdoli ................. H04L 5/0092 370/329 |
| 2019/0159180 | A1* | 5/2019 | Ly ..................... H04W 72/042 |
| 2020/0119874 | A1 | 4/2020 | Liu et al. |

FOREIGN PATENT DOCUMENTS

| | | |
|---|---|---|
| CN | 102612088 A | 7/2012 |
| CN | 104283581 A | 1/2015 |
| CN | 106512801 A | 5/2016 |
| CN | 106304097 A | 1/2017 |
| CN | 106850165 A | 6/2017 |
| CN | 106851840 A | 6/2017 |
| CN | 107223362 A | 9/2017 |
| KR | 20160005003 A | 1/2016 |
| RU | 253313 C2 | 11/2014 |
| RU | 2641664 C2 | 1/2018 |
| WO | 2012118269 A2 | 9/2012 |
| WO | 2017180030 A1 | 10/2017 |

OTHER PUBLICATIONS

First Office Action of the Chinese application No. 201780002122.6, dated May 7, 2021.
3GPP TSG RAN WG1 Meeting 91 R1-1720581,Nov. 28, 2017,CMCC,"Details on PRB grid offset indication".
3GPP TSG RAN WG1 Meeting 91 R1-1720649,Nov. 18, 2017,Qualcomm Incorporated,"Remaining system information delivery consideration".
3GPP TR 38.811V0.1.0 (Jun. 2017), 3rd Generation Partnership Project Technical Specification Group Radio Access Network, Study on New Radio (NR) to support Non Terrestrial Networks, (Release 15).
International Search Report in the international application No. PCT/CN2017/114024, dated Mar. 28, 2018.
English translation of the Written Opinion of the International Search Authority in the international application No. PCT/CN2017/114024, dated Mar. 28, 2018.
Non-Final Office Action of the U.S. Appl. No. 16/861,195, dated Nov. 30, 2021.
Vivo, "Discussion on Remaining Minimum System Information" 3GPP TSG RAN WG1 Meeting #90bis R1-1717461, Oct. 13, 2017 (Oct. 13, 2017), Section 2-3.
Intel Corporation, "Details on NR PBCH design", 3GPP TSG RAN WG1 Meeting RAN1 #89 R1-1707339, May 19, 2017 (May 19, 2017), entire document.
Samsung "Remaining details on remaining minimum system information delivery" 3GPP TSG RAN WG1#90b R1-1717578 Prague, Czech Republic, Oct. 9-13, 2017.
Supplementary European Search Report in the European application No. 18902021.7, dated Nov. 2, 2020.
Samsung:"NR-PBCH contents and payload size", 3GPP Draft; R1-1713554, Aug. 20, 2017.
Nokia et al:"Remaining details related to SS blocks", 3GPP Draft;R1-1721361 Nov. 27, 2017.
First Office Action of the Chinese application No. 201880000064.8, dated May 20, 2020.
Intel Corporation"On BWP reconfiguration", Intel Corporation,3GPP TSG-RAN WG4 Meeting#85 R4-1712875.2017.
Second Office Action of the Chinese application No. 201880000064.8, dated Jan. 28, 2021.
3GPP TSG RAN WG1 NR Ad Hoc Meeting R1-1709973,Huawei"On initial access for wideband carrier",2017.
3GPP TSG RAN WG1#91 R1-1721709, Samsung"Summary of Offline Discussion on RSMI CORESET Configuration",2017.
First Office Action of the Japanese application No. 2020-560519, dated Oct. 5, 2021.
CATT,"Offline summary for AI 6.1.2.2 Remaining details on Remaining Minimum System Information",3GPP TSG RAN WG1 R1/1716806,2017,Jan. 25, 2009.
MediaTek Inc.,"Summary of Bandwidth Part Remaining Issues",3GPP TSG RAN WG1 R1/1801067,,2018,Jan. 24, 2001.
Samsung,"Remaining details on SS burst set related procedures"[online], 3GPP TSG RAN WG1 R1/1715908,2017,Jan. 12, 2009.
International Search Report in the international application No. PCT/CN2018/074359, dated Nov. 1, 2018.
English translation of the Written Opinion of the International Search Authority in the international application No. PCT/CN2018/074359, dated Nov. 1, 2018.
First Office Action of the Russian application No. 202012746507, dated Dec. 8, 2020.
International Search Report in the international application No. PCT/CN2017/109152, dated Jan. 19, 2018.
English translation of the Written Opinion of the International Search Authority inthe international application No. PCT/CN2017/109152, dated Jan. 19, 2018.
First Office Action of the Chinese application No. 201780001705.7, dated Aug. 28, 2020.
Second Office Action of the Chinese application No. 201780001705.7, dated Feb. 10, 2021.

* cited by examiner

INFORMATION INDICATION METHOD AND APPARATUS, BASE STATION, AND USER EQUIPMENT

CROSS-REFERENCE TO RELATED APPLICATION

The present application is a national stage of International Application No. PCT/CN2017/114024 filed on Nov. 30, 2017, the disclosure of which is hereby incorporated by reference in its entirety.

TECHNICAL FIELD

The present disclosure generally relates to the technical field of communications, and more particularly, to an information indication method and apparatus, a method and device for searching for a common core resource set (CORESET) of remaining minimum system information (RMSI), a base station, User Equipment (UE) and a computer-readable storage medium.

BACKGROUND

In recent discussions of the 3rd Generation Partnership Project (3GPP), how to indicate information of a common CORESET of RMSI in a physical broadcast channel (PBCH) was considered to be an important problem that needs to be solved. The information of the CORESET of the RMSI may include frequency domain information, time domain information and the like. For the frequency domain information, frequency division multiplexing (FDM) and time division multiplexing (TDM) are required to be indicated, and in addition, frequency offset information is also required to be considered. A synchronization signal block (SSB) has two types of subcarrier spacings (SCSs) and a CORESET of RMSI corresponding to the SSB also has two types of SCSs, so that, for different bands, different SCSs of the SSB and different SCSs of the CORESET of the RMSI, there may be different minimum sets of resource block (RB) offsets between the CORESET of the RMSI and the SSB. For example, for a band, there may be a minimum set including two RB offsets, and for another band, there may be a minimum set including five RB offsets. In related arts, a base station may select an RB offset from a corresponding minimum set and send it to UE to enable the UE to find a corresponding CORESET of RMSI according to the RB offset. However, such a manner does not have good network configuration flexibility.

SUMMARY

In view of this, the present application discloses an information indication method and apparatus, a method and device for searching for a CORESET of RMSI, a base station, UE and a computer-readable storage medium, to improve configuration flexibility.

According to a first aspect of embodiments of the present disclosure, an information indication method may be applied to a base station and may include that:

time-frequency indication information configured for a common CORESET of RMSI corresponding to an SSB is added into a PBCH of the SSB;

in a case that the time-frequency indication information indicates the CORESET of the RMSI and the SSB are multiplexed in time division, a pre-stored correlation is queried according to a present band, an SCS of the SSB and an SCS of the CORESET of the RMSI to obtain an extended minimum set of RB offsets corresponding to the present band, the correlation being a corresponding relationship between different bands, different SCSs of the SSB and different SCSs of the CORESET of the RMSI and extended minimum sets of RB offsets, each of the extended minimum sets of RB offsets including offset indexes and RB offsets corresponding to the offset indexes, and the number of RB offsets in each of the extended minimum sets of RB offsets being a target number;

an RB offset is selected from the obtained extended minimum set of RB offsets, and an offset index of the selected RB offset is added to the time-frequency indication information; and the SSB comprising the time-frequency indication information is sent to UE in a beam scanning manner.

In an embodiment, the method may further include that:

for different bands, different SCSs of the SSB and different SCSs of the CORESET of the RMSI, minimum sets of RB offsets between the CORESET of the RMSI and the SSB are acquired;

a maximum number of RB offsets is determined from all the minimum sets of RB offsets, and the maximum number is determined as the target number; and a minimum set with the number of RB offsets smaller than the target number is extended to make the number of the extended RB offsets equal to the target number.

In an embodiment, the operation that the minimum set with the number of RB offsets smaller than the target number is extended may include that:

for each minimum set with the number of RB offsets smaller than the target number, an RB offset and an offset index of the RB offset corresponding to a difference set between a minimum set with the maximum number of RB offsets and a present minimum set of RB offsets are added to the present minimum set of RB offsets; or for each minimum set with the number of RB offsets smaller than the target number, an addition position for an RB offset to be added is determined, an offset index is determined according to the addition position, a magnitude of the RB offset to be added is determined according to the addition position and a magnitude of an adjacent RB offset, and the RB offset with the determined magnitude and an offset index of the RB offset with the determined magnitude are added to a present minimum set of RB offsets.

In an embodiment, the method may further include that:

in a case that the time-frequency indication information indicates the CORESET of the RMSI and the SSB are multiplexed in frequency division, the SSB comprising the time-frequency indication information is sent to the UE in the beam scanning manner.

According to a second aspect of the embodiments of the present disclosure, a method for searching for a minimum common CORESET of RMSI may be applied to UE and may include that:

an SSB comprising time-frequency indication information of a CORESET of RMSI is received from a base station, the time-frequency indication information being on a PBCH of the SSB;

an SCS of the SSB is determined, and the PBCH of the SSB is parsed to obtain time-frequency multiplexing indication information and an SCS of the CORESET of the RMSI; and in a case that the time-frequency multiplexing indication information indicates the CORESET of the RMSI and the SSB are multiplexed in time division, an offset index between the CORESET of the RMSI and the SSB is acquired from the time-frequency indication information, and the CORESET of the RMSI is searched for in a frequency domain according to the offset index, a present band where the SSB is, the SCS of the SSB and the SCS of the CORESET of the RMSI.

In an embodiment, the operation that the CORESET of the RMSI is searched in the frequency domain according to the offset index, the present band where the SSB is, the SCS of the SSB and the SCS of the CORESET of the RMSI may include that:

a pre-stored correlation is queried according to the offset index, the present band where the SSB is, the SCS of the SSB and the SCS of the CORESET of the RMSI to obtain a RB offset, the correlation being a corresponding relationship between different bands, different SCSs of the SSB and different SCSs of the CORESET of the RMSI and extended minimum sets of RB offsets, and each of the extended minimum sets of RB offsets including offset indexes and RB offsets corresponding to the offset indexes; and the CORESET of the RMSI is searched for in the frequency domain according to the obtained RB offset.

In an embodiment, the method may further include that:

in a case that the time-frequency indication information indicates the CORESET of the RMSI and the SSB are multiplexed in frequency division, the CORESET of the RMSI is searched for in a frequency domain which is lower than or higher than a predetermined frequency domain corresponding to the received SSB and a corresponding time domain.

According to a third aspect of the embodiments of the present disclosure, an information indication apparatus may be applied to a base station and may include:

an addition module, configured to add time-frequency indication information configured for a common CORESET of RMSI corresponding to an SSB to a PBCH of the SSB;

a first obtaining module, configured to, in a case that the time-frequency indication information added by the addition module indicates the CORESET of the RMSI and the SSB are multiplexed in time division, query a pre-stored correlation according to a present band, an SCS of the SSB and an SCS of the CORESET of the RMSI to obtain an extended minimum set of RB offsets corresponding to the present band, the correlation being a corresponding relationship between different bands, different SCSs of the SSB as well as different SCSs of the CORESET of the RMSI and extended minimum sets of RB offsets, each of the extended minimum sets of RB offsets including offset indexes and RB offsets corresponding to the offset indexes, and the number of RB offsets in each of the extended minimum sets of RB offsets being a target number;

a selection and addition module, configured to select an RB offset from the extended minimum set of RB offsets obtained by the first obtaining module and add an offset index of the selected RB offset to the time-frequency indication information; and a first sending module, configured to send the SSB comprising the time-frequency indication information with the offset index added by the selection and addition module to UE in a beam scanning manner.

In an embodiment, the device may further include:

an acquisition module, configured to, for different bands, different SCSs of the SSB and different SCSs of the CORESET of the RMSI, acquire minimum sets of RB offsets between the CORESET of the RMSI and the SSB;

a determination module, configured to determine a maximum number of RB offsets from all the minimum sets of RB offsets acquired by the acquisition module and determine the maximum number as the target number; and an extension module, configured to extend a minimum set with the number of RB offsets smaller than the target number to make the number of the extended RB offsets equal to the target number determined by the determination module.

In an embodiment, the extension module may include:

a first addition unit, configured to, for each minimum set with the number of RB offsets smaller than the target number, add, to a present minimum set of RB offsets, an RB offset and an offset index of the RB offset corresponding to a difference set between a minimum set with the maximum number of RB offsets and the present minimum set of RB offsets; or a second addition unit, configured to, for each minimum set with the number of RB offsets smaller than the target number, determine an addition position for an RB offset to be added, determine an offset index according to the addition position, determine a magnitude of the RB offset to be added according to the addition position and a magnitude of an adjacent RB offset, and add the RB offset with the determined magnitude and an offset index of the RB offset with the determined magnitude to a present minimum set of RB offsets.

In an embodiment, the device may further include:

a second sending module, configured to, in a case that the time-frequency indication information added by the addition module indicates the CORESET of the RMSI and the SSB are multiplexed in frequency division, send the SSB comprising the time-frequency indication information to the UE in the beam scanning manner.

According to a fourth aspect of the embodiments of the present disclosure, a device for searching for a minimum common CORESET of RMSI may be applied to UE and may include:

a receiving module, configured to receive an SSB comprising time-frequency indication information of a CORESET of RMSI from a base station, the time-frequency indication information being on a PBCH of the SSB;

a determination and parsing module, configured to determine an SCS of the SSB received by the receiving module and parse the PBCH of the SSB to obtain time-frequency multiplexing indication information and an SCS of the CORESET of the RMSI; and an acquisition and searching module, configured to, in a case that the time-frequency multiplexing indication information parsed by the determination and parsing module indicates the CORESET of the RMSI and the SSB are multiplexed in time division, acquire an offset index between the CORESET of the RMSI and the SSB from the time-frequency indication information and search for the CORESET of the RMSI in a frequency domain according to the offset index, a present band where the SSB is, the SCS of the SSB and the SCS of the CORESET of the RMSI.

In an embodiment, the acquisition and searching module may include:

a query and obtaining unit, configured to query a pre-stored correlation according to the offset index, the present band where the SSB is, the SCS of the SSB and the SCS of the CORESET of the RMSI to obtain a RB offset, the correlation being a corresponding relationship between different bands, different SCSs of the SSB and different SCSs of the CORESET of the RMSI and extended minimum sets of RB offsets, and each of the extended minimum sets of RB offsets including offset indexes and RB offsets corresponding to the offset indexes; and a searching unit, configured to search for the CORESET of the RMSI in the frequency domain according to the RB offset obtained by the query and obtaining unit.

In an embodiment, the device may further include:

a determination and searching module, configured to, in a case that the time-frequency indication information parsed by the determination and parsing module indicates the CORESET of the RMSI and the SSB are multiplexed in frequency division, search for the CORESET of the RMSI in a frequency domain lower than or higher than a predetermined frequency domain corresponding to the received SSB and a corresponding time domain.

According to a fifth aspect of the embodiments of the present disclosure, a base station may include:

a processor; and a memory configured to store instructions executable by the processor, wherein the processor may be configured to:

add time-frequency indication information configured for a common CORESET of RMSI corresponding to an SSB to a PBCH of the SSB;

in a case that the time-frequency indication information indicates the CORESET of the RMSI and the SSB are multiplexed in time division, query a pre-stored correlation according to a present band, an SCS of the SSB and an SCS of the CORESET of the RMSI to obtain an extended minimum set of RB offsets corresponding to the present band, the correlation being a corresponding relationship between different bands, different SCSs of the SSB as well as different SCSs of the CORESET of the RMSI and extended minimum sets of RB offsets, each of the extended minimum sets of RB offsets including offset indexes and RB offsets corresponding to the offset indexes, and the number of RB offsets in each of the extended minimum sets of RB offsets being a target number;

select an RB offset from the obtained extended minimum set of RB offsets and add an offset index of the selected RB offset to the time-frequency indication information; and send the SSB comprising the time-frequency indication information to UE in a beam scanning manner.

According to a sixth aspect of the embodiments of the present disclosure, UE may include:

a processor; and a memory device configured to store instructions executable by the processor, wherein the processor may be configured to:

receive an SSB comprising time-frequency indication information of a CORESET of RMSI from a base station, the time-frequency indication information being on a PBCH of the SSB;

determine an SCS of the SSB and parse the PBCH of the SSB to obtain time-frequency multiplexing indication information and an SCS of the CORESET of the RMSI; and in a case that the time-frequency multiplexing indication information indicates the CORESET of the RMSI and the SSB are multiplexed in time division, acquire an offset index between the CORESET of the RMSI and the SSB from the time-frequency indication information and search for the CORESET of the RMSI in a frequency domain according to the offset index, a present band where the SSB is, the SCS of the SSB and the SCS of the CORESET of the RMSI.

According to a seventh aspect of the embodiments of the present disclosure, a computer-readable storage medium is provided, in which computer instructions may be stored, the instructions being executable by a processor to implement the steps of the information indication method.

According to an eighth aspect of the embodiments of the present disclosure, a computer-readable storage medium is provided, in which computer instructions may be stored, the instructions being executable by a processor to implement the steps of the method for searching for a minimum common CORESET of RMSI.

The technical solutions provided in the embodiments of the present disclosure may have the following beneficial effects.

A pre-stored correlation may be queried according to a present band, an SCS of a SSB and an SCS of a CORESET of RMSI to obtain an extended minimum set of RB offsets corresponding to the present band, the extended minimum set of RB offsets including a target number of RB offsets, and then a base station may select an RB offset from the minimum set of RB offsets including the target number of RB offsets, so that configuration flexibility is improved.

When the parsed time-frequency multiplexing indication information indicates the CORESET of the RMSI and the SSB are multiplexed in time division, the offset index of the CORESET of the RMSI and the SSB may be acquired from the time-frequency indication information, and the CORESET of the RMSI may be searched for in a corresponding frequency domain according to the offset index, the present band where the SSB is, the SCS of the SSB and the SCS of the CORESET of the RMSI. The implementation manner is simple.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Figure 1:
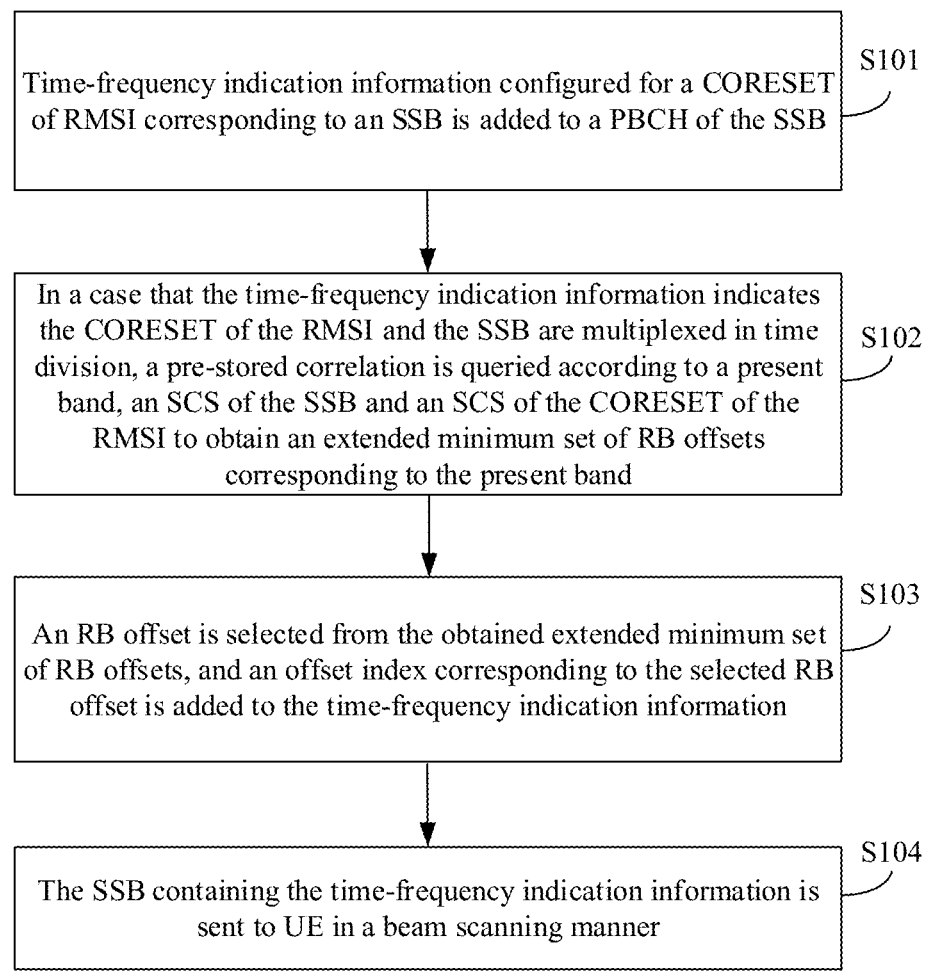
FIG. 1 is a flowchart showing an information indication method according to an exemplary embodiment of the present application.

FIG. 1 is a flowchart showing an information indication method according to an exemplary embodiment of the present application. The embodiment is described from a base station side. As shown in FIG. 1, the information indication method includes the following steps.

In step S101, time-frequency indication information configured for a CORESET of RMSI corresponding to an SSB is added to a PBCH of the SSB.

Figure 2A:
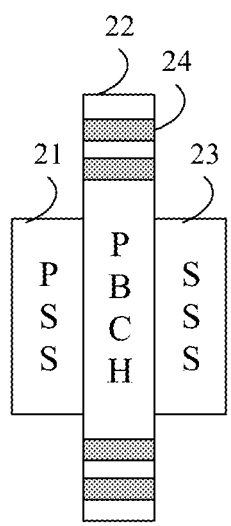
FIG. 2A is a structure diagram of an SSB according to an exemplary embodiment of the present application.

The PBCH may be in the SSB. As shown in FIG. 2A, the SSB includes a primary synchronization signal (PSS) 21, a PBCH 22, a secondary synchronization signal (SSS) 23 and a demodulation reference signal (DMRS) 24 which is configured to demodulate the PBCH 23.

Figure 2B:
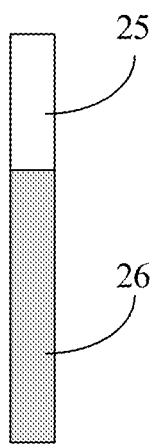
FIG. 2B is a first schematic diagram illustrating FDM of a CORESET of RMSI and an SSB according to an exemplary embodiment of the present application.
Figure 2C:
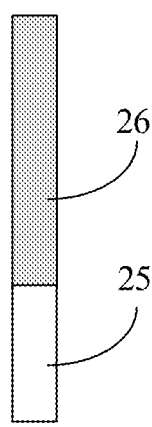
FIG. 2C is a second schematic diagram illustrating FDM of a CORESET of RMSI and an SSB according to an exemplary embodiment of the present application.
Figure 2D:
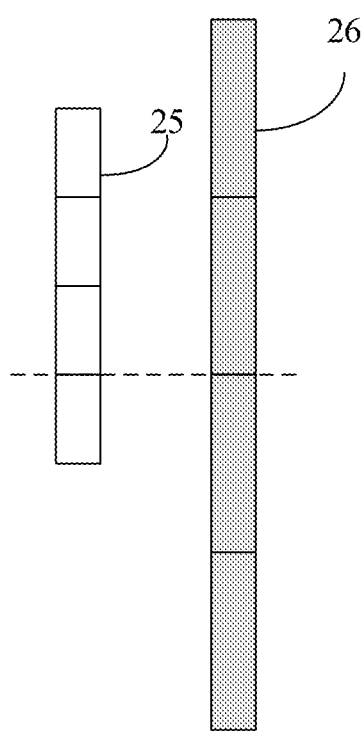
FIG. 2D is a first schematic diagram illustrating TDM of a CORESET of RMSI and an SSB according to an exemplary embodiment of the present application.
Figure 2E:
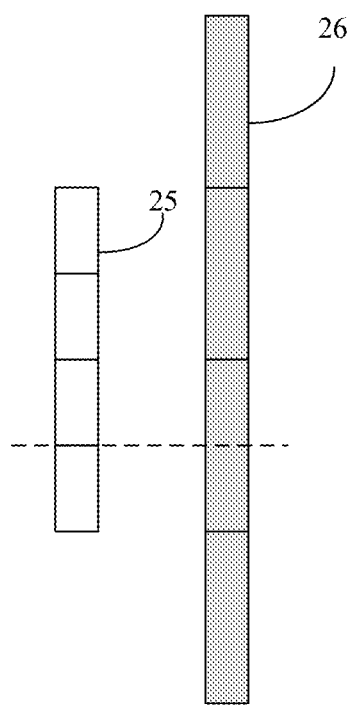
FIG. 2E is a second schematic diagram illustrating TDM of a CORESET of RMSI and an SSB according to an exemplary embodiment of the present application.

In the embodiment, the SSB may correspond to the CORESET of the RMSI, and FDM or TDM may be implemented for the SSB and the corresponding CORESET of the RMSI. A base station, after configuring time-frequency indication information for the CORESET of the RMSI corresponding to the SSB, may add the time-frequency indication information into the PBCH of the SSB. In case of the SSB and the CORESET of the RMSI being multiplexed in frequency division, a correlation between the SSB and the CORESET of the RMSI may be shown in FIG. 2B or FIG. 2C, and it can be seen from FIG. 2B or FIG. 2C that RBs of the SSB 25 and the CORESET 26 for the RMSI are adjacent, namely there is no RB offset therebetween. In case of the SSB and the CORESET of the RMSI being multiplexed in time division, the correlation between the SSB and the CORESET of the RMSI may be shown in FIG. 2D or FIG. 2E, and there is an RB offset therebetween.

In step S102, in a case that the time-frequency indication information indicates the CORESET of the RMSI and the SSB are multiplexed in time division, a pre-stored correlation is queried according to a present band, an SCS of the SSB and an SCS of the CORESET of the RMSI to obtain an extended minimum set of RB offsets corresponding to the present band; the correlation may be a corresponding relationship between different bands, different SCSs of the SSB and different SCSs of the CORESET of the RMSI and extended minimum sets of RB offsets, each of the extended minimum sets of RB offsets may include offset indexes and RB offsets corresponding to offset indexes, and the number of RB offsets in each of the extended minimum sets of RB offsets may be a target number.

The SSB may have two types of SCSs, and the CORESET of the RMSI corresponding to the SSB may also have two types of SCSs. In case of the CORESET of the RMSI and the SSB being multiplexed in time division, there may be many RB offsets between the CORESET of the RMSI and the SSB, for example, the RB offsets in FIG. 2D or FIG. 2E. In the embodiment, there may be many RB offsets because there are many different positions between the CORESET of the RMSI and the SSB, each position corresponding to an RB offset. For reducing the number of occupied bits, in the embodiment, only the RB offsets that are required to be represented are considered, namely the minimum set of RB offsets refers to a set of the RB offsets that are required to be represented. Since different minimum sets include different numbers of RB offsets, the minimum sets may be extended for unified representation, for example, all of them are respectively extended to have a target number of RB offsets. Accordingly, the extended minimum sets of RB offsets refer to all the minimum sets in which the number of RB offsets has been extended to the target number.

In the embodiment, different extended minimum sets of RB offsets may be obtained for different bands, different SCSs of the SSB and different SCSs of the CORESET of the RMSI, and each extended minimum set of RB offsets may include offset indexes and RB offsets corresponding to the offset indexes.

For example, extended minimum set 1 of RB offsets corresponding to band 1, SCS1 of the SSB and SCS1 of the CORESET of the RMSI is shown in Table 1.

TABLE 1

Contents of Extended Minimum Set 1 of RB Offsets

| Offset index | RB offset |
| --- | --- |
| 0 | A |
| 1 | B |
| 2 | C |
| 3 | D |

For example, extended minimum set 21 of RB offsets corresponding to band 2, the SCS1 of the SSB and the SCS1 of the CORESET of the RMSI is shown in Table 2-1.

TABLE 2-1

Contents of Extended Minimum Set 21 of RB Offsets

| Offset index | RB offset |
| --- | --- |
| 4 | M |
| 5 | N |
| 6 | E |
| 7 | F |

For another example, extended minimum set 22 of RB offsets corresponding to the band 2, SCS2 of the SSB and SCS2 of the CORESET of the RMSI is shown in Table 2-2.

TABLE 2-2

Contents of Extended Minimum Set 22 of RB Offsets

| Offset index | RB offset |
|---|---|
| 8 | G |
| 9 | H |
| 10 | E |
| 11 | F |

It is to be noted that Table 1, Table 2-1 and Table 2-2 are only examples of the extended minimum sets of RB offsets and the contents thereof may be represented in other formats during a practical application.

In step S103, an RB offset is selected from the obtained extended minimum set of RB offsets, and an offset index of the selected RB offset is added into the time-frequency indication information.

It is assumed that the extended minimum set of RB offsets obtained by the base station is the set represented by Table 1, an RB offset may be selected from Table 1 according to a configuration requirement, for example, RB offset A is selected, and then offset index corresponding to the RB offset A, i.e., offset index 0, may be added into the time-frequency indication information.

In addition, in a case that the number of bits occupied by the time-frequency indication information is less than preset bits, for example, the number of the bits occupied by the time-frequency indication information is 7 and the preset bits are 2 to the n bits, such as 8 bits, then there may be a spare bit, and the spare bit may be reserved for extension, for example, may be configured to indicate other information.

In step S104, the SSB comprising the time-frequency indication information is sent to UE in a beam scanning manner.

According to the embodiments, a pre-stored correlation may be queried according to a present band, an SCS of a SSB and an SCS of a CORESET of RMSI to obtain an extended minimum set of RB offsets corresponding to the present band, the extended minimum set of RB offsets including a target number of RB offsets, and then a base station may select an RB offset from the minimum set including the target number of RB offsets, so that configuration flexibility is improved.

Figure 3:
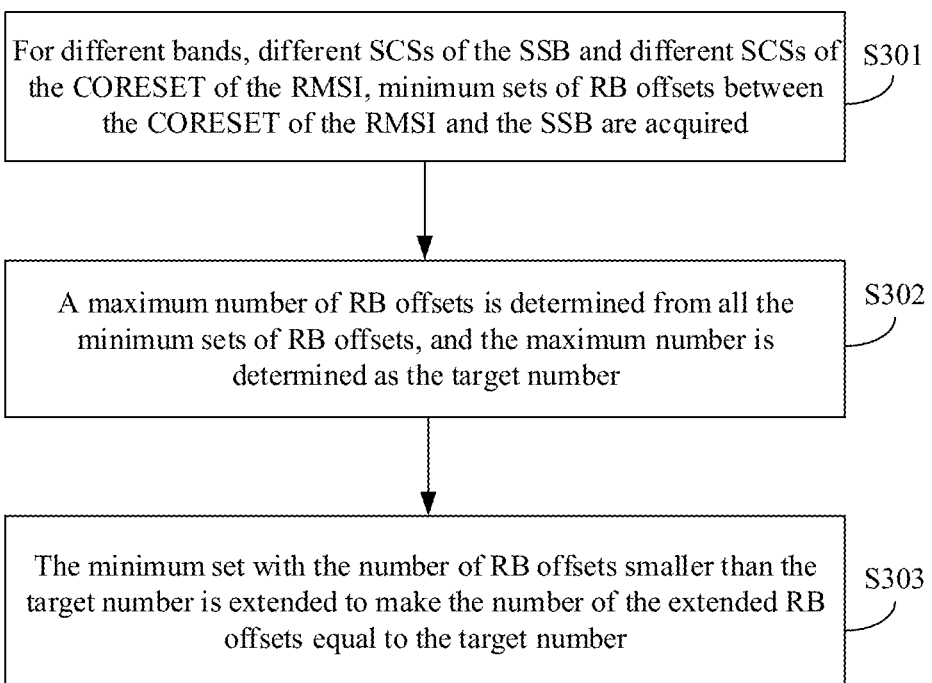
FIG. 3 is a flowchart showing another information indication method according to an exemplary embodiment of the present application.

FIG. 3 is a flowchart showing another information indication method according to an exemplary embodiment of the present application. As shown in FIG. 3, before step S102, the method may further include the following steps.

In step S301, for different bands, different SCSs of the SSB and different SCSs of the CORESET of the RMSI, minimum sets of RB offsets between the CORESET of the RMSI and the SSB are acquired.

In case of the CORESET of the RMSI and the SSB being multiplexed in time division, there may be many RB offsets between the CORESET of the RMSI and the SSB. For reducing the number of the occupied bits, in the embodiment, only the RB offsets that are required to be represented are considered, namely the minimum set of RB offsets refers to the set including the RB offsets that are required to be represented. In step S302, a maximum number of RB offsets is determined from all the minimum sets of RB offsets, and the maximum number is determined as the target number.

It is assumed that, for band 1, SCS1 of a SSB and SCS1 of a CORESET of RMSI, the acquired minimum set 11 of RB offsets between the CORESET of the RMSI and the SSB includes two RB offsets; for the band 1, the SCS1 of the SSB and the SCS2 of the CORESET of the RMSI, an acquired minimum set 12 of RB offsets between the CORESET of the RMSI and the SSB includes three RB offsets; for the band 1, the SCS2 of the SSB and the SCS1 of the CORESET of the RMSI, an acquired minimum set 13 of RB offsets between the CORESET of the RMSI and the SSB includes four RB offsets; and for the band 1, the SCS2 of the SSB and the SCS2 of the CORESET of the RMSI, an acquired minimum set of RB offsets between the CORESET of the RMSI and the SSB includes one RB offset, then the maximum number of the RB offsets in all the minimum sets of RB offsets is 4, and 4 is determined as the target number. A hypothesis is made here that a minimum set with the maximum number of RB offsets is shown in Table 1.

In step S303, the minimum set with the number of RB offsets smaller than the target number is extended to make the number of the extended RB offsets equal to the target number.

The minimum set with the number of RB offsets smaller than the target number may be extended in multiple manners and, for example, may be extended through the following manners.

Manner 1): for each minimum set with the number of RB offsets smaller than the target number, an RB offset and offset index thereof corresponding to a difference set between a minimum set with the maximum number of RB offsets and a present minimum set of RB offsets are added into the present minimum set of RB offsets.

There is made such a hypothesis that, if the number of the RB offsets in the present minimum set of RB offsets is smaller than the target number by 1, contents of an obtained minimum set 3 of RB offsets corresponding to the band 1 are shown in Table 3.

TABLE 3

Contents of Minimum Set 3 of RB Offsets

| Offset index | RB offset |
|---|---|
| 0 | A |
| 1 | B |
| 2 | C |

Since the number of RB offsets in the minimum set 3 of RB offsets is three which is smaller than four, it is needed to add one RB offset into the minimum set 3 of RB offsets. The offset index and RB offset corresponding to the difference set between a minimum set with the maximum number of RB offsets (i.e., the set shown in Table 1) and the present minimum set of RB offsets (i.e., the set as shown in Table 3) may be added into the present minimum set 3 of RB offsets, and the set obtained after addition is shown in Table 1.

Manner 2): for each minimum set with the number of RB offsets smaller than the target number, an addition position for an RB offset to be added is determined, an offset index is determined according to the addition position, a magnitude of the RB offset to be added is determined according to the addition position and a magnitude of an adjacent RB offset, and the RB offset with the determined magnitude and the offset index thereof are added into the present minimum set of RB offsets.

There is made such a hypothesis that contents of an obtained RB offset minimum set 4 corresponding to the band 2 are shown in Table 4.

TABLE 4

Contents of Minimum Set 4 of RB Offsets

| Offset index | RB offset |
| --- | --- |
| 0 | A |
| 2 | C |

Since the number of RB offsets in the minimum set 4 of RB offsets is two which is smaller than four, it is needed to add two RB offsets into the minimum set 4 of RB offsets. The RB offsets required to be added are the RB offsets to be added. The base station may determine according to a preset principle, for example, a principle of equipartition, that addition positions of the RB offsets to be added are a second position and a fourth position, namely corresponding offset indexes may be determined to be 1 and 3. Then, magnitudes of the RB offsets to be added may be determined according to the addition positions and magnitudes of adjacent RB offsets. For example, the magnitudes of the RB offsets to be added may be determined through a certain algorithm or a certain formula. For example, it may be calculated in an average calculation manner that the magnitude of the RB offset corresponding to the offset index 1 is A+(C−A/2) and the magnitude of the RB offset corresponding to the offset index 3 is C+(C−A)/2. It is to be noted that the abovementioned numerical values are only examples and, during the practical application, other numerical values may be adopted. Then, the RB offsets to be added which have determined magnitudes and the offset indexes thereof may be added into the present minimum set of RB offsets to obtain an extended minimum set 5 of RB offsets shown in Table 5.

TABLE 5

Contents of Extended Minimum Set 5 of RB Offsets

| Offset index | RB offset |
| --- | --- |
| 0 | A |
| 1 | A + (C − A/2) |
| 2 | C |
| 3 | C + (C − A)/2 |

Thus it can be seen that, according to the embodiment, the minimum set with the number of RB offsets smaller than the target number may be extended in multiple manners. The implementation means is flexible.

According to the embodiments, the maximum number of the RB offsets may be determined from all the minimum sets of RB offsets, the maximum number may be determined as the target number, and then the minimum set with the number of RB offsets smaller than the target number may be extended to make the number of the extended RB offsets equal to the target number, so that a condition is provided to ensure that the base station may subsequently select an RB offset from more RB offsets.

FIG. 3 is a flowchart showing another information indication method according to an exemplary embodiment of the present application. As shown in FIG. 3, after step S101, the method may further include step S105.

In step S105, in a case that the time-frequency multiplexing indication information indicates the CORESET of the RMSI and the SSB are multiplexed in frequency division, the SSB comprising the time-frequency multiplexing indication information is sent to the UE in the beam scanning manner.

In the embodiment, in case of FDM, the RBs of the two are adjacent, namely there is no RB offset therebetween.

According to the embodiments, under the condition that time-frequency multiplexing indication information indicates FDM of CORESET of RMSI and a SSB, the SSB comprising the time-frequency multiplexing indication information may be directly sent to UE in a beam scanning manner, so that a base station may find the CORESET of the RMSI.

Figure 4:
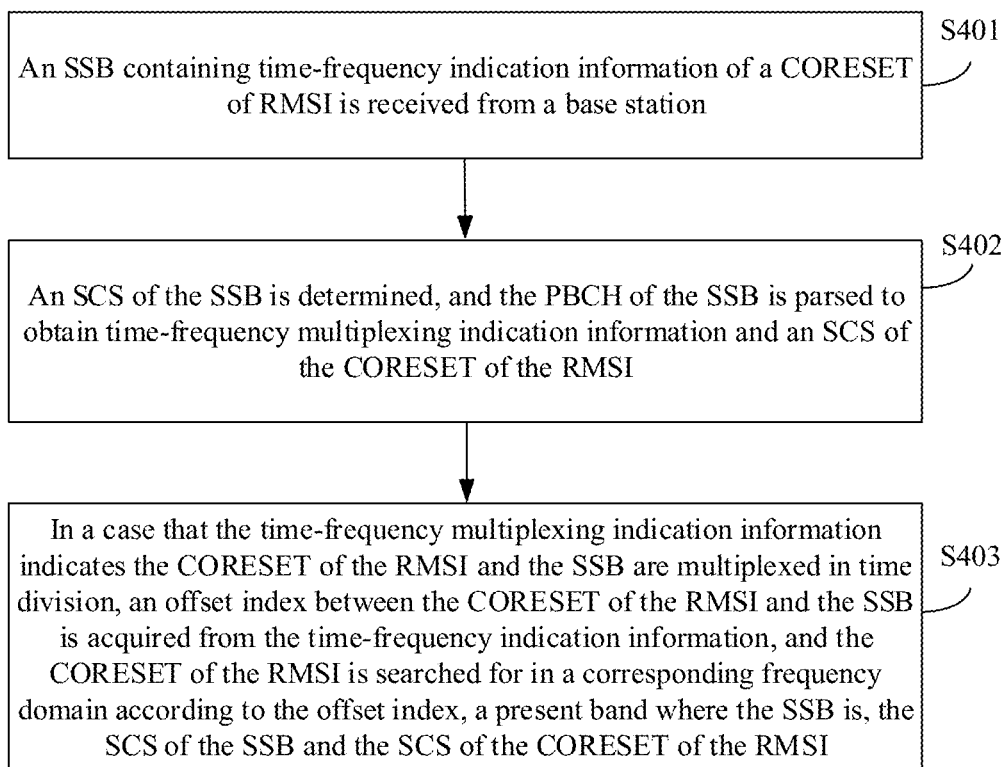
FIG. 4 is a flowchart showing a method for searching for a CORESET of RMSI according to an exemplary embodiment of the present application.

FIG. 4 is a flowchart showing a method for searching for a CORESET of RMSI according to an exemplary embodiment of the present application. The embodiment is described from a UE side. As shown in FIG. 4, the method includes the following steps.

In step S401, an SSB comprising time-frequency indication information of a CORESET of RMSI is received from a base station, the time-frequency indication information being in a PBCH of the SSB.

In step S402, an SCS of the SSB is determined, and the PBCH of the SSB is parsed to obtain time-frequency multiplexing indication information and an SCS of the CORESET of the RMSI.

UE may try to parse a synchronization signal through two predetermined SCSs of a band where the SSB is and determine the SCS through which the synchronization signal is correctly parsed, and then may parse the PBCH of the SSB to obtain the SCS and time-frequency multiplexing indication information of the CORESET of the RMSI.

In step S403, in a case that the time-frequency multiplexing indication information indicates the CORESET of the RMSI and the SSB are multiplexed in time division, an offset index between the CORESET of the RMSI and the SSB is acquired from the time-frequency indication information, and the CORESET of the RMSI is searched for in a corresponding frequency domain according to the offset index, a present band where the SSB is, the SCS of the SSB and the SCS of the CORESET of the RMSI.

After the offset index, the present band where the SSB is, the SCS of the SSB and the SCS of the CORESET of the RMSI are acquired, a pre-stored correlation may be queried to obtain the corresponding RB offset, and the corresponding frequency domain may be searched for the CORESET of the RMSI according to the obtained RB offset. For example, there is made such a hypothesis that an extended minimum set of RB offsets obtained by querying the correlation according to the present band where the SSB is, the SCS of the SSB and the SCS of the CORESET of the RMSI is shown in Table 1, then Table 1 may be queried according to the offset index, for example, index 0, to obtain RB offset 1, and the corresponding frequency domain may be searched for the CORESET of the RMSI according to the RB offset A.

The correlation is a corresponding relationship between different bands, different SCSs of the SSB and difference SCSs of the CORESET of the RMSI and extended minimum sets of RB offsets, and each of the extended minimum sets of RB offsets may include an offset index and a RB offset corresponding to the offset index.

According to the embodiments, when the parsed time-frequency multiplexing indication information indicates the CORESET of the RMSI and the SSB are multiplexed in time division, the index of the offset between the CORESET of the RMSI and the SSB may be acquired from the time-frequency indication information, and the CORESET of the RMSI may be searched for in the corresponding frequency domain according to the offset index, the present band where the SSB is, the SCS of the SSB and the SCS of the CORESET of the RMSI. The implementation manners are simple.

Figure 5:
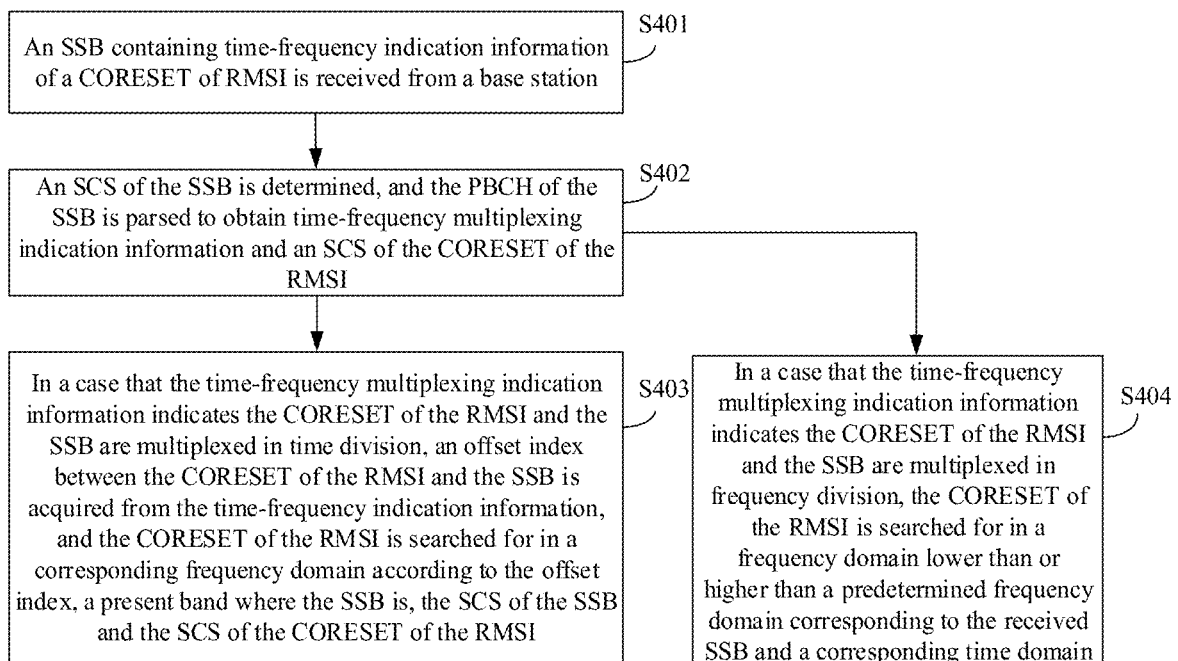
FIG. 5 is a flowchart showing another method for searching for a CORESET of RMSI according to an exemplary embodiment of the present application.

FIG. 5 is a flowchart showing another method for searching for a CORESET of RMSI according to an exemplary embodiment of the present application. As shown in FIG. 5, after step S402, the method may further include step S404.

In step S404, in a case that the time-frequency multiplexing indication information indicates the CORESET of the RMSI and the SSB are multiplexed in frequency division, the CORESET of the RMSI is searched for in a frequency domain lower than or higher than a predetermined frequency domain corresponding to the received SSB and a corresponding time domain.

The UE, after learning that the time-frequency multiplexing indication information indicates the CORESET of the RMSI and the SSB are multiplexed in frequency division, may search for the CORESET of the RMSI in a frequency domain adjacent to a frequency domain where the SSB is and in a corresponding time domain, namely searching for the CORESET of the RMSI in the frequency domain lower than or higher than the predetermined frequency domain corresponding to the received SSB and in the corresponding time domain.

According to the embodiment, the CORESET of the RMSI may be searched for according to obtained information. The implementation manners are simple.

Figure 6:
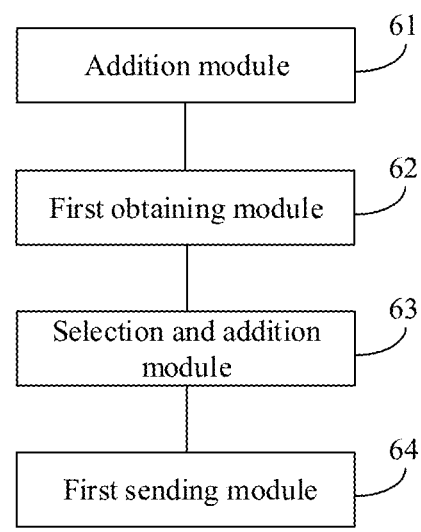
FIG. 6 is a block diagram of an information indication apparatus according to an exemplary embodiment.

FIG. 6 is a block diagram of an information indication apparatus according to an exemplary embodiment. The device may be in a base station. As shown in FIG. 6, the device includes an addition module 61, a first obtaining module 62, a selection and addition module 63 and a first sending module 64.

The addition module 61 is configured to add time-frequency indication information configured for a common CORESET of RMSI corresponding to an SSB into a PBCH of the SSB.

The PBCH may be in the SSB. As shown in FIG. 2A, the SSB may include a PSS 21, a PBCH 22, an SSS 23 and a DMRS 24 configured to demodulate the PBCH 23.

In the embodiment, the SSB may correspond to the CORESET of the RMSI, and FDM or TDM may be implemented for the SSB and the corresponding CORESET of the RMSI. The base station, after configuring the time-frequency indication information for the CORESET of the RMSI corresponding to the SSB, may add the time-frequency indication information into the PBCH of the SSB. In case of FDM of the SSB and the CORESET of the RMSI, a correlation thereof may be shown in FIG. 2B or FIG. 2C, and it can be seen from FIG. 2B or FIG. 2C that RBs of the SSB 25 and the CORESET 26 for the RMSI are adjacent, namely there is no RB offset therebetween. In case of the SSB and the CORESET of the RMSI being multiplexed in time division, the correlation thereof may be shown in FIG. 2D or FIG. 2E, and there is an RB offset therebetween.

The first obtaining module 62 is configured to, in a case that the time-frequency indication information added by the addition module 61 indicates the CORESET of the RMSI and the SSB are multiplexed in time division, query a pre-stored correlation according to a present band, an SCS of the SSB and an SCS of the CORESET of the RMSI to obtain an extended minimum set of RB offsets corresponding to the present band; the correlation may be a correlation between different bands, different SCSs of the SSB and different SCSs of the CORESET of the RMSI and extended minimum sets of RB offsets; each of the extended minimum sets of RB offsets may include offset indexes and RB offsets corresponding to the offset indexes; and the number of RB offsets in the extended minimum set of RB offsets may be a target number.

The SSB may have two SCSs, and the CORESET of the RMSI corresponding to the SSB may also have two SCSs. In case of the CORESET of the RMSI and the SSB being multiplexed in time division, there may be many RB offsets between the CORESET of the RMSI and the SSB, for example, RB offsets in FIG. 2D or FIG. 2E. In the embodiment, there may be many RB offsets because there are many different positions between the CORESET of the RMSI and the SSB, each position corresponding to an RB offset. For reducing the number of occupied bits, in the embodiment, only the RB offsets that are required to be represented are considered, namely the minimum set of RB offsets refers to a set of the RB offsets that are required to be represented. Since different minimum sets include different numbers of RB offsets, all of the minimum sets may be extended for unified representation, for example, the RB offsets in all the minimum sets may be extended to the target number. The extended minimum sets of RB offsets refer to all the minimum sets in which the number of RB offsets has been extended to the target number.

In the embodiment, different extended minimum sets of RB offsets may be obtained for different bands, different SCSs of the SSB and different SCSs of the CORESET of the RMSI, and each extended minimum set of RB offsets may include offset indexes and RB offsets corresponding to the offset indexes.

For example, extended minimum set 1 of RB offsets corresponding to band 1, an SCS1 of a SSB and SCS1 of a CORESET of RMSI is shown in Table 1.

For example, extended minimum set 21 of RB offsets corresponding to band 2, the SCS1 of the SSB and the SCS1 of the CORESET of the RMSI is shown in Table 2-1.

For another example, extended minimum set 22 of RB offsets corresponding to the band 2, SCS2 of the SSB and SCS2 of the CORESET of the RMSI is shown in Table 2-2.

It is to be noted that Table 1, Table 2-1 and Table 2-2 are only examples of the extended minimum set of RB offsets and the contents thereof may be represented in other formats during a practical application.

The selection and addition module 63 is configured to select an RB offset from the extended minimum set of RB offsets obtained by the first obtaining module 62 and add an offset index of the selected RB offset into the time-frequency indication information.

It is assumed that the extended minimum set of RB offsets obtained by the base station is the set represented by Table 1, an RB offset may be selected from Table 1 according to a configuration requirement, for example, RB offset A is selected, and then an offset index corresponding to the RB offset A, i.e., offset index 0, may be added into the time-frequency indication information.

In addition, if the number of bits occupied by the time-frequency indication information is less than preset bits, for example, the number of the bits occupied by the time-frequency indication information is 7 and the preset bits are 2 to the n bits, such as 8 bits, then there may be a spare bit, and the spare bit may be reserved for extension, for example, may be configured to indicate other information.

The first sending module 64 is configured to send the SSB comprising the time-frequency indication information with the offset index added by the selection and addition module 63 to UE in a beam scanning manner.

According to the embodiments, a pre-stored correlation may be queried according to a present band, a SCS of a SSB and a SCS of a CORESET of RMSI to obtain an extended minimum set of RB offsets corresponding to the present band, the extended minimum set of RB offsets including the target number of RB offsets, and then a base station may select an RB offset from the RB offset minimum set including the target number of RB offsets, so that configuration flexibility is improved.

Figure 7:
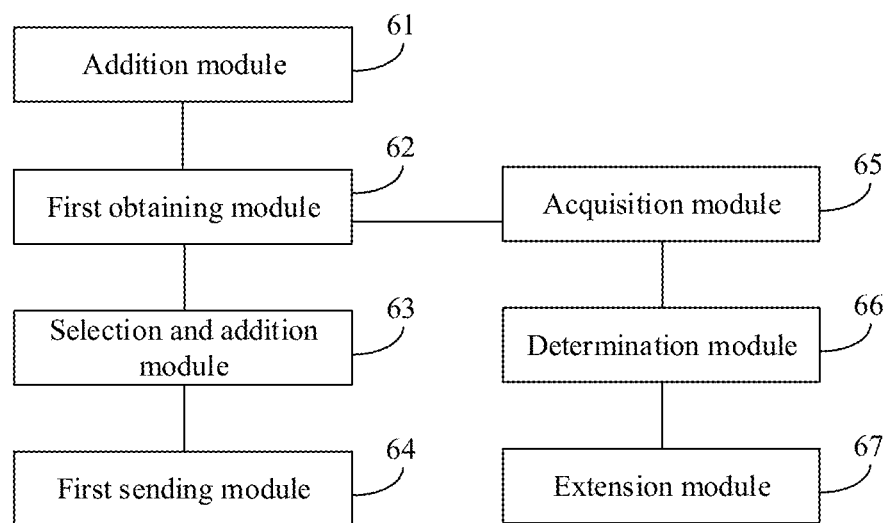
FIG. 7 is a block diagram of another information indication apparatus according to an exemplary embodiment.

FIG. 7 is a block diagram of another information indication apparatus according to an exemplary embodiment. As shown in FIG. 7, based on the embodiment shown in FIG. 6, the device may further include an acquisition module 65, a determination module 66 and an extension module 67.

The acquisition module 65 is configured to, for different bands, different SCSs of the SSB and different SCSs of the CORESET of the RMSI, acquire minimum sets of RB offsets between the CORESET of the RMSI and the SSB.

In case of the CORESET of the RMSI and the SSB being multiplexed in time division, there may be many RB offsets for the CORESET of the RMSI and the SSB. For reducing the number of the occupied bits, in the embodiment, only the RB offsets that are required to be represented are considered, namely the minimum set of RB offsets refers to the set including the RB offsets that are required to be represented.

The determination module 66 is configured to determine a maximum number of RB offsets from all the minimum sets of RB offsets acquired by the acquisition module 65 and determine the maximum number as the target number.

It is assumed that, for the band 1, the SCS1 of the SSB and the SCS1 of the CORESET of the RMSI, the acquired minimum set 11 of RB offsets between the CORESET of the RMSI and the SSB includes two RB offsets; for the band 1, the SCS1 of the SSB and the SCS2 of the CORESET of the RMSI, an acquired minimum set 12 of RB offsets between the CORESET of the RMSI and the SSB includes three RB offsets; for the band 1, the SCS2 of the SSB and the SCS1 of the CORESET of the RMSI, an acquired minimum set 13 of RB offsets between the CORESET of the RMSI and the SSB includes four RB offsets; and for the band 1, the SCS2 of the SSB and the SCS2 of the CORESET of the RMSI, an acquired minimum set 13 of RB offsets between the CORESET of the RMSI and the SSB includes one RB offset. In such cases, the maximum number of the RB offsets in all the minimum sets of RB offsets is 4, and 4 may be determined as the target number. There is made such a hypothesis that a minimum set with the maximum number of RB offsets is shown in Table 1.

The extension module 67 is configured to extend the minimum set with the number of RB offsets smaller than the target number to make the number of the extended RB offsets equal to the target number determined by the determination module 66.

According to the embodiments, a maximum number of the RB offsets in all the minimum sets of RB offsets may be determined, the maximum number may be determined as the target number, and then the minimum set with the number of RB offsets smaller than the target number may be extended to make the number of the extended RB offsets equal to the target number, so that a condition is provided to ensure that the base station may subsequently select an RB offset from more RB offsets.

Figure 8:
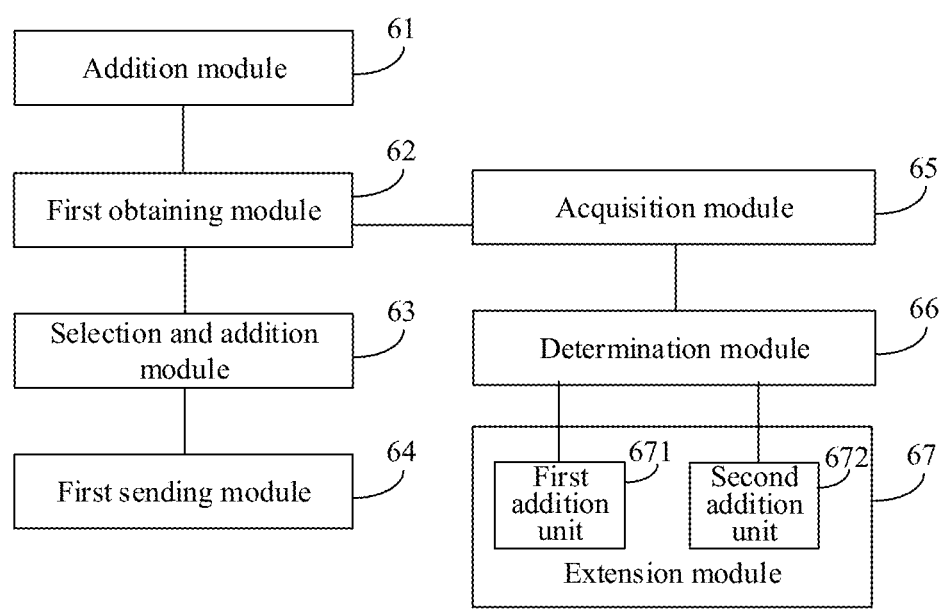
FIG. 8 is a block diagram of another information indication apparatus according to an exemplary embodiment.

FIG. 8 is a block diagram of another information indication apparatus according to an exemplary embodiment. As shown in FIG. 8, based on the embodiment shown in FIG. 7, the extension module 67 may include a first addition unit 671 or a second addition unit 672.

The first addition unit 671 is configured to, for each minimum set with the number of RB offsets smaller than the target number, add an RB offset and offset index thereof corresponding to a difference set between a minimum set with the maximum number of RB offsets and the present minimum set of RB offsets to the present minimum set of RB offsets.

There is made such a hypothesis that contents of an obtained RB offset minimum set 3 corresponding to the band 1 are shown in Table 3.

Since the number of RB offsets in the RB offset minimum set 3 is three which is smaller than four, it is needed to add one RB offset into the minimum set 3 of RB offsets. The offset index and RB offset corresponding to the difference set between a minimum set with the maximum number of RB offsets (i.e., the set shown in Table 1) and the present minimum set of RB offsets (i.e., the set shown in Table 3) may be added into the present minimum set of RB offsets 3, and the set obtained after addition is shown in Table 1.

The second addition unit 672 is configured to, for each minimum set with the number of RB offsets smaller than the target number, determine an addition position for an RB offset to be added, determine an offset index according to the addition position, determine a magnitude of the RB offset to be added according to the addition position and a magnitude of an adjacent RB offset and add the RB offset with the determined magnitude and the offset index thereof into the present minimum set of RB offsets.

Manner 2): for each minimum set with the number of RB offsets smaller than the target number, the addition position for the RB offset to be added is determined, the offset index is determined according to the addition position, the magnitude of the RB offset to be added is determined according to the addition position and the magnitude of the adjacent RB offset, and the RB offset with the determined magnitude and the corresponding offset index thereof are added into the present minimum set of RB offsets.

There is made such a hypothesis that contents of an obtained RB offset minimum set 4 corresponding to the band 2 are shown in Table 4.

Since the number of RB offsets in the RB offset minimum set 4 is two which is smaller than four, it is needed to add two RB offsets into the minimum set 4 of RB offsets. The RB offsets required to be added may be the RB offsets to be added. The base station may determine according to a preset principle, such as a principle of equipartition, that addition positions of the RB offsets to be added are a second position and a fourth position, namely corresponding offset indexes may be determined to be 1 and 3. Then, magnitudes of the RB offsets to be added may be determined according to the addition positions and magnitudes of adjacent RB offsets. For example, the magnitudes of the RB offsets to be added may be determined through a certain algorithm or a certain formula. For example, it may be calculated in an average calculation manner that the magnitude of the RB offset corresponding to the offset index 1 may be $A+(C-A/2)$ and the magnitude of the RB offset corresponding to the offset index 3 may be $C+(C-A)/2$. It is to be noted that the abovementioned numerical values are only examples and, during the practical application, other numerical values may be adopted. Then, the RB offsets to be added which have the determined magnitudes and the offset indexes thereof may be added into the present minimum set of RB offsets to obtain an extended minimum set 5 of RB offsets as shown in Table 5.

According to the embodiments, the minimum set with the number of RB offsets smaller than the target number may be extended in multiple manners, and implementation means is flexible.

Figure 9:
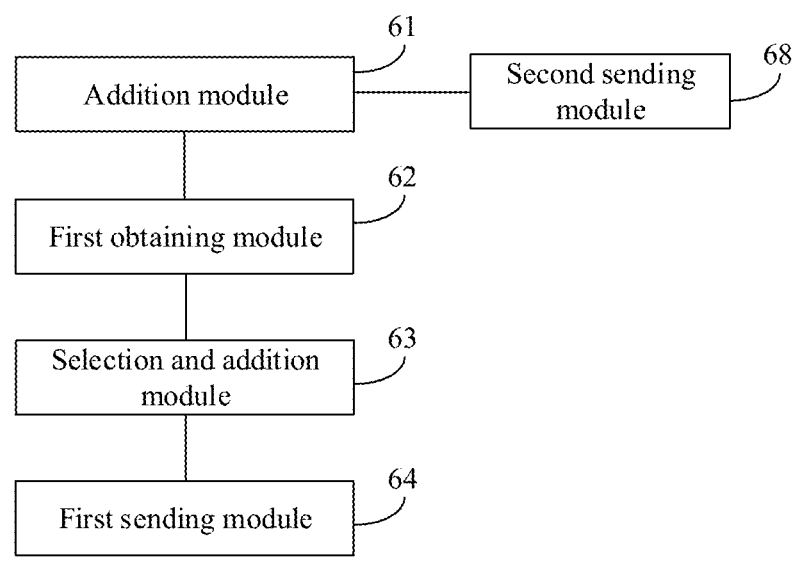
FIG. 9 is a block diagram of another information indication apparatus according to an exemplary embodiment.

FIG. 9 is a block diagram of another information indication apparatus according to an exemplary embodiment. As shown in FIG. 9, based on the embodiment shown in FIG. 6, the device may further include a second sending module 68.

The second sending module 68 is configured to, in a case that the time-frequency indication information added by the addition module 61 indicates the CORESET of the RMSI and the SSB are multiplexed in frequency division, send the SSB comprising the time-frequency indication information to the UE in the beam scanning manner.

In the embodiment, in case of FDM, the RBs of the CORESET of the RMSI and the SSB may be adjacent, namely there is no RB offset therebetween.

According to the embodiments, under the condition that the time-frequency multiplexing indication information indicates the CORESET of the RMSI and the SSB are multiplexed in frequency division, the SSB comprising the time-frequency multiplexing indication information may be directly sent to the UE in the beam scanning manner, so that the base station may find the CORESET of the RMSI.

Figure 10:
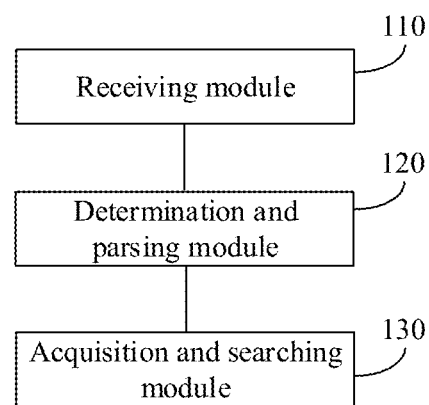
FIG. 10 is a block diagram of a device for searching for a CORESET of RMSI according to an exemplary embodiment.

FIG. 10 is a block diagram of a device for searching for a CORESET of RMSI according to an exemplary embodiment. The device may be in UE. As shown in FIG. 10, the device may include:

a receiving module 110, configured to receive an SSB comprising time-frequency indication information of a CORESET of RMSI from a base station, the time-frequency indication information being in a PBCH of the SSB;

a determination and parsing module 120, configured to determine an SCS of the SSB received by the receiving module 110 and parse the PBCH of the SSB to obtain time-frequency multiplexing indication information and an SCS of the CORESET of the RMSI.

The UE may try to parse a synchronization signal through two predetermined SCSs of a band where the SSB is and determine the SCS through which the synchronization signal is correctly parsed, and then may parse the PBCH of the SSB to obtain the SCS and time-frequency multiplexing indication information of the CORESET of the RMSI; and an acquisition and searching module 130, configured to, in a case that the time-frequency multiplexing indication information parsed by the determination and parsing module 120 indicates the CORESET of the RMSI and the SSB are multiplexed in time division, acquire an offset index between the CORESET of the RMSI and the SSB from the time-frequency indication information and search for the CORESET of the RMSI in a corresponding frequency domain according to the offset index, a present band where the SSB is, the SCS of the SSB and the SCS of the CORESET of the RMSI.

According to the embodiments, when the parsed time-frequency multiplexing indication information indicates the CORESET of the RMSI and the SSB are multiplexed in time division, the index of the offset between the CORESET of the RMSI and the SSB may be acquired from the time-frequency indication information, and the corresponding frequency domain may be searched for the CORESET of the RMSI according to the offset index, the present band where the SSB is, the SCS of the SSB and the SCS of the CORESET of the RMSI. The implementation manner is simple.

Figure 11A:
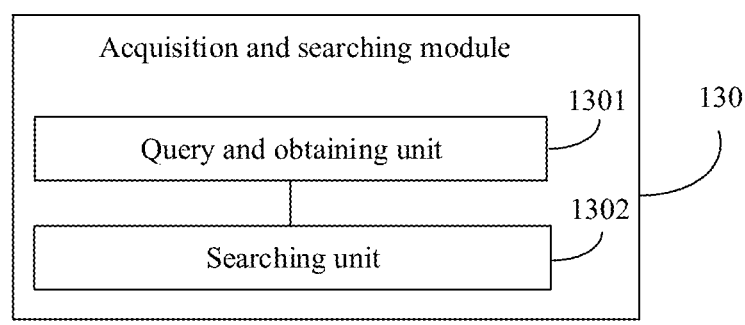
FIG. 11A is a block diagram of another device for searching for a CORESET of RMSI according to an exemplary embodiment.

FIG. 11A is a block diagram of another device for searching for a CORESET of RMSI according to an exemplary embodiment. As shown in FIG. 11A, based on the embodiment shown in FIG. 10, the acquisition and searching module 130 may include a query and obtaining unit 1301 and a searching unit 1302.

The query and obtaining unit 1301 is configured to query a pre-stored correlation according to the offset index, the present band where the SSB is, the SCS of the SSB and the SCS of the CORESET of the RMSI to obtain a RB offset; the correlation may be a corresponding relationship between different bands, different SCSs of the SSB and different SCSs of the CORESET of the RMSI and extended minimum sets of RB offsets, and each of the extended minimum sets of RB offsets may include offset indexes and RB offset corresponding to the offset indexes.

The searching unit 1302 is configured to search for the CORESET of the RMSI in the corresponding frequency domain according to the RB offset obtained by the query and obtaining unit 1301.

For example, there is made such a hypothesis that an extended minimum set of RB offsets obtained by querying the correlation according to the present band where the SSB is, the SCS of the SSB and the SCS of the CORESET of the RMSI is shown in Table 1, then Table 1 may be queried according to the offset index, such as index 0, to obtain RB offset 1, and the CORESET of the RMSI may be searched for in the corresponding frequency domain according to the RB offset A.

According to the embodiments, the pre-stored correlation may be queried to obtain a RB offset, and the CORESET of the RMSI may be searched for in a corresponding frequency domain according to the obtained RB offset. The implementation manner is simple.

Figure 11B:
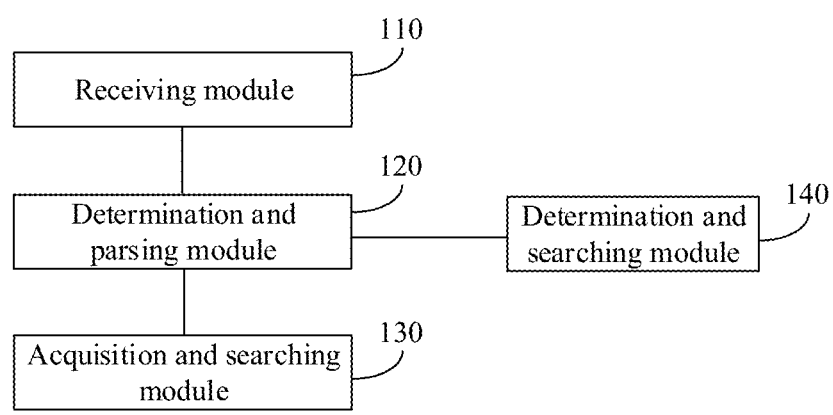
FIG. 11B is a block diagram of another device for searching for a CORESET of RMSI according to an exemplary embodiment.

FIG. 11B is a block diagram of another device for searching for a CORESET of RMSI according to an exemplary embodiment. As shown in FIG. 11B, based on the embodiment shown in FIG. 10, the device may further include a determination and searching module 140.

The determination and searching module 140 is configured to, in a case that the time-frequency multiplexing indication information parsed by the determination and parsing module 120 indicates the CORESET of the RMSI and the SSB are multiplexed in frequency division, search for the CORESET of the RMSI in a frequency domain lower than or higher than a predetermined frequency domain corresponding to the received SSB and a corresponding time domain.

The UE, after learning that the time-frequency multiplexing indication information indicates the CORESET of the RMSI and the SSB are multiplexed in frequency division, may search for the CORESET of the RMSI in a frequency domain adjacent to a frequency domain where the SSB is and in the corresponding time domain, namely searching for the CORESET of the RMSI in the frequency domain lower than or higher than the predetermined frequency domain corresponding to the received SSB and the corresponding time domain.

According to the embodiments, the CORESET of the RMSI may be searched for according to obtained information. The implementation manner is simple.

Figure 12:
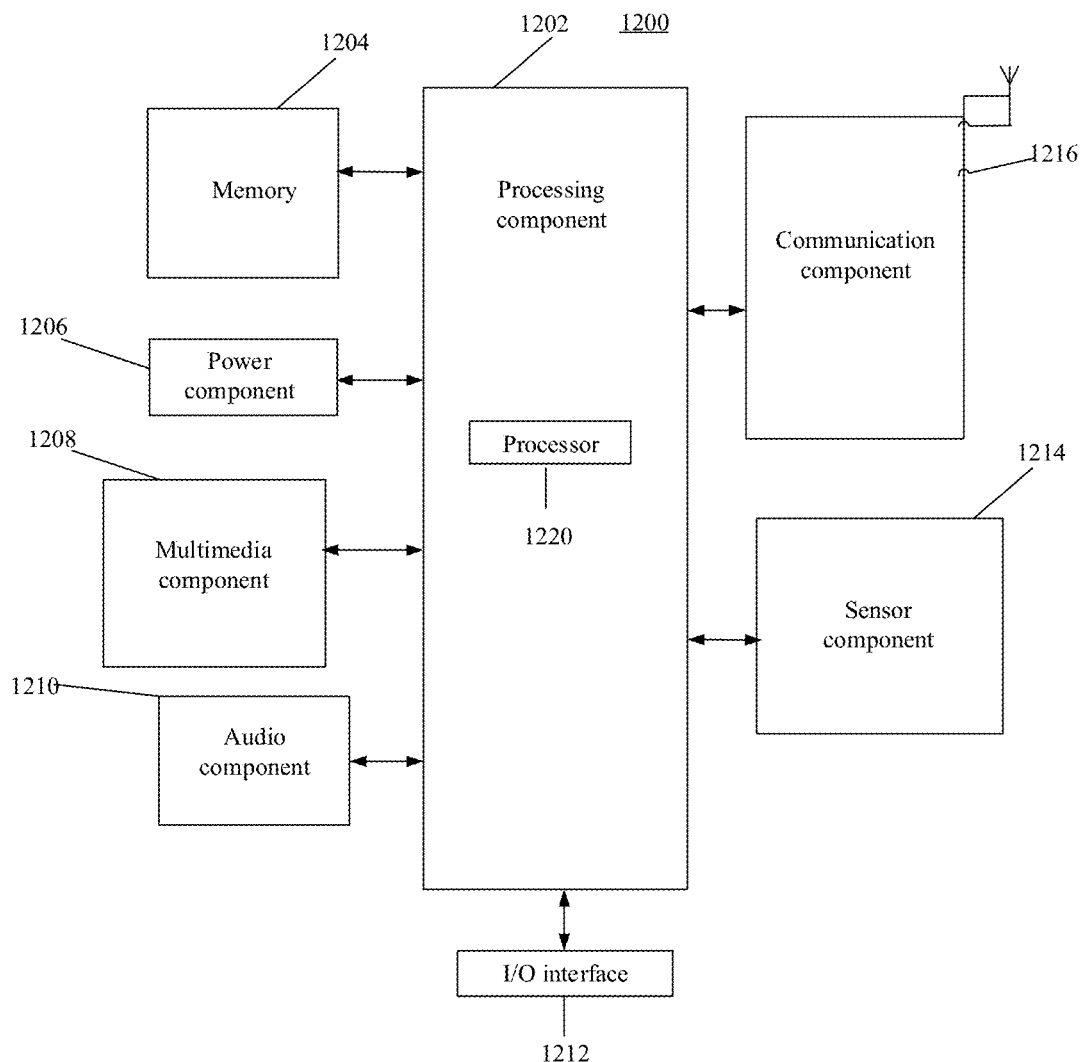
FIG. 12 is a block diagram of a device for searching for a CORESET of RMSI according to an exemplary embodiment.

FIG. 12 is a block diagram of a device for searching for a CORESET of RMSI according to an exemplary embodiment. For example, the device 1200 may be UE such as a mobile phone, a computer, a digital broadcast terminal, a messaging device, a gaming console, a tablet, a medical device, exercise equipment and a personal digital assistant.

Referring to FIG. 12, the device 1200 may include one or more of the following components: a processing component 1202, a memory device 1204, a power component 1206, a multimedia component 1208, an audio component 1210, an Input/Output (I/O) interface 1212, a sensor component 1214, and a communication component 1216.

The processing component 1202 is typically configured to control overall operations of the device 1200, such as the operations associated with display, telephone calls, data communications, camera operations, and recording operations. The processing component 1202 may include one or more processors 1220 to execute instructions to perform all or part of the steps in the abovementioned method. Moreover, the processing component 1202 may include one or more modules which facilitate interaction between the processing component 1202 and the other components. For instance, the processing component 1202 may include a multimedia module to facilitate interaction between the multimedia component 1208 and the processing component 1202.

One processor 1220 in the processing component 1202 may be configured to:

receive an SSB comprising time-frequency indication information of a CORESET of RMSI from a base station, the time-frequency indication information being in a PBCH of the SSB;

parse the PBCH of the SSB to obtain the time-frequency indication information; and in a case that the time-frequency multiplexing indication information indicates the CORESET of the RMSI and the SSB are multiplexed in time division, acquire an offset index between the CORESET of the RMSI and the SSB from the time-frequency indication information and search for the CORESET of the RMSI in a corresponding frequency domain according to the offset index.

The memory device 1204 is configured to store various types of data to support the operation of the device 1200. Examples of such data include instructions for any applications or methods operated on the device 1200, contact data, phonebook data, messages, pictures, video, etc. The memory 1204 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 1206 is configured to provide power for various components of the device 1200. The power component 1206 may include a power management system, one or more power supplies, and other components associated with generation, management and distribution of power for the device 1200.

The multimedia component 1208 may include a screen providing an output interface between the device 1200 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some embodiments, the multimedia component 1208 includes a front camera and/or a rear camera. The front camera and/or the rear camera may receive external multimedia data when the device 1200 is in an operation mode, such as a photographing mode or a video mode. Each of the front camera and the rear camera may be a fixed optical lens system or have focusing and optical zooming capabilities.

The audio component 1210 is configured to output and/or input an audio signal. For example, the audio component 1210 includes a Microphone (MIC), and the MIC is configured to receive an external audio signal when the device 1200 is in the operation mode, such as a call mode, a recording mode and a voice recognition mode. The received audio signal may further be stored in the memory 1204 or sent through the communication component 1216. In some embodiments, the audio component 1210 further includes a speaker configured to output the audio signal.

The I/O interface 1212 is configured to provide an interface between the processing component 1202 and a peripheral interface module, and the peripheral interface module may be a keyboard, a click wheel, a button and the like. The button may include, but not limited to: a home button, a volume button, a starting button and a locking button.

The sensor component 1214 may include one or more sensors configured to provide status assessment in various aspects for the device 1200. For instance, the sensor component 1214 may detect an on/off status of the device 1200 and relative positioning of components, such as a display and small keyboard of the device 1200, and the sensor component 1214 may further detect a change in a position of the device 1200 or a component of the device 1200, presence or absence of contact between the user and the device 1200, orientation or acceleration/deceleration of the device 1200 and a change in temperature of the device 1200. The sensor component 1214 may include a proximity sensor configured to detect presence of an object nearby without any physical contact. The sensor component 1214 may also include a light sensor, such as a Complementary Metal Oxide Semiconductor (CMOS) or Charge Coupled Device (CCD) image sensor, configured for use in an imaging application. In some embodiments, the sensor component 1214 may also include an acceleration sensor, a gyroscope sensor, a magnetic sensor, a pressure sensor or a temperature sensor.

The communication component 1216 is configured to facilitate wired or wireless communication between the device 1200 and another device. The device 1200 may access a communication-standard-based wireless network, such as a Wireless Fidelity (Wi-Fi) network, a 2nd-Generation (2G) or 3rd-Generation (3G) network or a combination thereof. In an exemplary embodiment, the communication component 1216 receives a broadcast signal or broadcast associated information from an external broadcast management system through a broadcast channel. In an exemplary embodiment, the communication component 1216 further includes a Near Field Communication (NFC) module to facilitate short-range communication. For example, the NFC module may be implemented based on a Radio Frequency Identification (RFID) technology, an Infrared Data Association (IrDA) technology, an Ultra-Wide Band (UWB) technology, a Bluetooth (BT) technology and another technology.

In an exemplary embodiment, the device 1200 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method.

In an exemplary embodiment, there is also provided a non-transitory computer-readable storage medium including instructions, such as the memory 1204 including instructions. The instructions may be executed by the processor 1220 of the device 1200 to implement the abovementioned method. For example, the non-transitory computer-readable storage medium may be a ROM, a Random Access Memory (RAM), a Compact Disc Read-Only Memory (CD-ROM), a magnetic tape, a floppy disc, an optical data storage device and the like.

Figure 13:
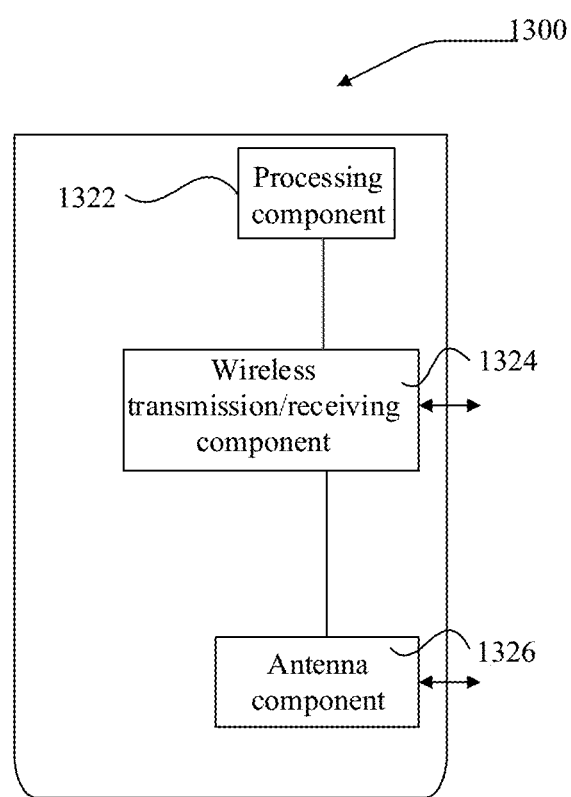
FIG. 13 is a block diagram of an information indication apparatus according to an exemplary embodiment.

FIG. 13 is a block diagram of another information indication apparatus according to an exemplary embodiment. The device 1300 may be provided as a base station. Referring to FIG. 13, the device 1300 includes a processing component 1322, a wireless transmission/receiving component 1324, an antenna component 1326 and a wireless interface-specific signal processing part, and the processing component 1322 may further include one or more processors.

One processor in the processing component 1322 may be configured to:

add time-frequency indication information configured for a common CORESET of RMSI corresponding to an SSB into a PBCH of the SSB;

in a case that the time-frequency indication information indicates the CORESET of the RMSI and the SSB are multiplexed in time division, query a pre-stored correlation according to a present band, an SCS of the SSB and an SCS of the CORESET of the RMSI to obtain an extended minimum set of RB offsets corresponding to the present band; the correlation may be a corresponding relationship between different bands, different SCSs of the SSB and different SCSs of the CORESET of the RMSI and extended minimum sets of RB offsets, each of the extended minimum sets of RB offsets may include offset indexes and RB offset corresponding to the RB offset indexes, and the number of RB offsets in the extended minimum set of RB offsets may be a target number;

select an RB offset from the obtained extended minimum set of RB offsets and add offset indexes corresponding to the selected RB offset into the time-frequency indication information; and send the SSB comprising the time-frequency indication information to UE in a beam scanning manner.

In an exemplary embodiment, there is also provided a non-transitory computer-readable storage medium including instructions, and the instructions may be executed by the processing component 1322 of the device 1300 to implement the information indication method. For example, the non-transitory computer-readable storage medium may be a ROM, a RAM, a CD-ROM, a magnetic tape, a floppy disc, an optical data storage device and the like.

The device embodiments substantially correspond to the method embodiments, and thus related parts refer to part of descriptions of the method embodiments. The device embodiment described above is only schematic, units described as separate parts therein may or may not be physically separated, and parts displayed as units may or may not be physical units, and namely may be located in the same place or may also be distributed to multiple network units. Part or all of the modules therein may be selected according to a practical requirement to achieve the purpose of the solutions of the embodiments. Those of ordinary skill in the art may understand and implement without creative work.

It is to be noted that relational terms "first," "second" and the like in the present disclosure are adopted only to distinguish one entity or operation from another entity or operation and not always to require or imply existence of any such practical relationship or sequence between the entities or operations. Terms "include" and "have" or any other variation thereof is intended to cover nonexclusive inclusions, so that a process, method, object or device including a series of elements not only includes those elements, but also includes other elements that are not clearly listed, or further includes elements intrinsic to the process, the method, the object or the device. Under the condition of no more limitations, an element defined by statement "including a/an . . . " does not exclude existence of another element that is the same in a process, method, object or device including the element.

Other implementation solutions of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

The invention claimed is:

1. An information indication method, implemented by a base station, the method comprising:

adding time-frequency indication information configured for a common control resource set (CORESET) of remaining minimum system information (RMSI) to a physical broadcast channel (PBCH) of a synchronization signal block (SSB), wherein the CORESET of the RMSI is corresponding to the SSB;

in a case that the time-frequency indication information indicates the CORESET of the RMSI and the SSB are multiplexed in time division, querying a pre-stored correlation according to a present band, a subcarrier spacing (SCS) of the SSB and an SCS of the CORESET of the RMSI to obtain an extended minimum set of resource block (RB) offsets corresponding to the present band, wherein the correlation is a corresponding relationship between different bands, different SCSs of the SSB as well as different SCSs of the CORESET of the RMSI and extended minimum sets of RB offsets, each of the extended minimum sets of RB offsets comprises offset indexes and RB offsets corresponding to the offset indexes, and the number of RB offsets in each of the extended minimum sets of RB offsets is a target number;

selecting an RB offset from the obtained extended minimum set of RB offsets, and adding an offset index of the selected RB offset to the time-frequency indication information; and sending the SSB comprising the time-frequency indication information to User Equipment (UE) in a beam scanning manner.

2. The method of claim 1, further comprising:

for different bands, different SCSs of the SSB and different SCSs of the CORESET of the RMSI, acquiring minimum sets of RB offsets between the CORESET of the RMSI and the SSB;

determining a maximum number of RB offsets from all the minimum sets of RB offsets, and determining the maximum number as the target number; and extending a minimum set with the number of RB offsets smaller than the target number to make the number of the extended RB offsets equal to the target number.

3. The method of claim 2, wherein extending the minimum set with the number of RB offsets smaller than the target number comprises:

for each minimum set with the number of RB offsets smaller than the target number, adding, to a present minimum set of RB offsets, an RB offset and an offset index of the RB offset corresponding to a difference set between a minimum set with the maximum number of RB offsets and the present minimum set of RB offsets; or for each minimum set with the number of RB offsets smaller than the target number, determining an addition position for an RB offset to be added, determining an offset index according to the addition position, determining a magnitude of the RB offset to be added according to the addition position and a magnitude of an adjacent RB offset, and adding the RB offset with the determined magnitude and an offset index of the RB offset with the determined magnitude to a present minimum set of RB offsets.

4. The method of claim 1, further comprising:

in a case that the time-frequency indication information indicates the CORESET of the RMSI and the SSB are multiplexed in frequency division, sending the SSB comprising the time-frequency indication information to the UE in the beam scanning manner.

5. A method for searching for a minimum common control resource set (CORESET) of remaining minimum system information (RMSI), implemented by User Equipment (UE), the method comprising:

receiving a synchronization signal block (SSB) comprising time-frequency indication information of a CORESET of RMSI from a base station, wherein the time-frequency indication information is on a physical broadcast channel (PBCH) of the SSB;

determining a subcarrier spacing (SCS) of the SSB, and parsing the PBCH of the SSB to obtain time-frequency multiplexing indication information and an SCS of the CORESET of the RMSI; and in a case that the time-frequency multiplexing indication information indicates the CORESET of the RMSI and the SSB, acquiring an offset index between the CORESET of the RMSI and the SSB from the time-frequency indication information, and searching for the CORESET of the RMSI in a frequency domain according to the offset index, a present band where the SSB is, the SCS of the SSB and the SCS of the CORESET of the RMSI.

6. The method of claim 5, wherein searching for the CORESET of the RMSI in the frequency domain according to the offset index, the present band where the SSB is, the SCS of the SSB and the SCS of the CORESET of the RMSI comprises:

querying a pre-stored correlation according to the offset index, the present band where the SSB is, the SCS of the SSB and the SCS of the CORESET of the RMSI to obtain a resource block (RB) offset, wherein the correlation is a corresponding relationship between different bands, different SCSs of the SSB and different SCSs of the CORESET of the RMSI and extended minimum sets of RB offsets, and each of the extended minimum sets of RB offsets comprises offset indexes and RB offsets corresponding to the offset indexes; and searching for the CORESET of the RMSI in the frequency domain according to the obtained RB offset.

7. The method of claim 5, further comprising:

in a case that the time-frequency indication information indicates the CORESET of the RMSI and the SSB are multiplexed in frequency division, searching for the CORESET of the RMSI in a frequency domain which is lower than or higher than a predetermined frequency domain corresponding to the received SSB and a corresponding time domain.

8. User equipment (UE), comprising:

a processor; and a memory device configured to store instructions executable by the processor, wherein the processor is configured to:

receive a synchronization signal block (SSB) comprising time-frequency indication information of a CORESET of RMSI from a base station, wherein the time-frequency indication information is on a physical broadcast channel (PBCH) of the SSB;

determine a subcarrier spacing (SCS) of the SSB received by the receiving module and parse the PBCH of the SSB to obtain time-frequency multiplexing indication information and an SCS of the CORESET of the RMSI; and in a case that the time-frequency multiplexing indication information indicates the CORESET of the RMSI and the SSB are multiplexed in time division, acquire an offset index between the CORESET of the RMSI and the SSB from the time-frequency indication information and search for the CORESET of the RMSI in a frequency domain according to the offset index, a present band where the SSB is, the SCS of the SSB and the SCS of the CORESET of the RMSI.

9. The device of claim 8, wherein the processor is further configured to:

query a pre-stored correlation according to the offset index, the present band where the SSB is, the SCS of the SSB and the SCS of the CORESET of the RMSI to obtain a resource block (RB) offset, wherein the correlation is a corresponding relationship between different bands, different SCSs of the SSB and different SCSs of the CORESET of the RMSI and extended minimum sets of RB offsets, and each of the extended minimum sets of RB offsets comprises offset indexes and RB offsets corresponding to the offset indexes; and search for the CORESET of the RMSI in the frequency domain according to the RB offset.

10. The UE of claim 8, wherein the processor is further configured to:

in a case that the time-frequency indication information indicates the CORESET of the RMSI and the SSB are multiplexed in time division, search for the CORESET of the RMSI in a frequency domain lower than or higher than a predetermined frequency domain corresponding to the received SSB and a corresponding time domain.

11. A communication system implementing the method of claim 1, comprising the base station and the UE, wherein the UE is configured to:

when parsed time-frequency multiplexing indication information indicates the CORESET of the RMSI and the SSB are multiplexed in time division, acquire the offset index of the CORESET of the RMSI and the SSB from the time-frequency indication information; and search for the CORESET of the RMSI in a corresponding frequency domain according to the offset index, the present band where the SSB is, the SCS of the SSB and the SCS of the CORESET of the RMSI.

12. The communication system of claim 11, wherein the UE is further configured to:
query a pre-stored correlation according to the offset index, the present band where the SSB is, the SCS of the SSB and the SCS of the CORESET of the RMSI to obtain a resource block (RB) offset, wherein the correlation is a corresponding relationship between different bands, different SCSs of the SSB and different SCSs of the CORESET of the RMSI and extended minimum sets of RB offsets, and each of the extended minimum sets of RB offsets comprises offset indexes and RB offsets corresponding to the offset indexes; and
search for the CORESET of the RMSI in the frequency domain according to the obtained RB offset.

13. The communication system of claim 12, wherein the UE is further configured to:
in a case that the time-frequency indication information indicates the CORESET of the RMSI and the SSB are multiplexed in frequency division, search for the CORESET of the RMSI in a frequency domain which is lower than or higher than a predetermined frequency domain corresponding to the received SSB and a corresponding time domain.

14. A non-transitory computer-readable storage medium having instructions stored thereon for execution by a processing circuit to implement operations of the method of claim 1.

15. A non-transitory computer-readable storage medium having instructions stored thereon for execution by a processing circuit to implement operations of the method of claim 5.

* * * * *